US012785521B2

(12) United States Patent
Schroth

(10) Patent No.: US 12,785,521 B2
(45) Date of Patent: Nov. 3, 2026

(54) MACHINE LEARNING TECHNIQUES OF CLASSIFIERS FOR THE DETECTION OF FAULTS OR DEFECTS IN MOTORS

(71) Applicant: ebm-papst Mulfingen GmbH & Co. KG, Mulfingen (DE)

(72) Inventor: Sebastian Schroth, Kupferzell (DE)

(73) Assignee: EBM PAPST MULFINGEN GMBH & CO KG, Mulfingen (DE)

( * ) Notice: Subject to any disclaimer, the term of this patent is extended or adjusted under 35 U.S.C. 154(b) by 381 days.

(21) Appl. No.: 18/524,160

(22) Filed: Nov. 30, 2023

(65) Prior Publication Data

US 2024/0250589 A1 Jul. 25, 2024

(51) Int. Cl.

*H02P 6/22* (2006.01)
*H02K 11/00* (2016.01)
*H02K 11/27* (2016.01)
*H02K 15/02* (2006.01)

(52) U.S. Cl.

CPC ......... *H02K 15/02* (2013.01); *H02K 11/0094* (2013.01); *H02K 11/27* (2016.01)

(58) Field of Classification Search

CPC .... H02K 15/02; H02K 11/0094; H02K 11/27; H02K 11/26; H02P 29/024; H02P 29/60

See application file for complete search history.

(56) References Cited

U.S. PATENT DOCUMENTS

| | | | | |
|---|---|---|---|---|
| 10,355,634 | B1 * | 7/2019 | Zhang | G01R 31/346 |
| 2014/0039817 | A1 | 2/2014 | Dayan | |
| 2019/0058428 | A1 | 2/2019 | Barlini | |

FOREIGN PATENT DOCUMENTS

| | | | |
|---|---|---|---|
| EP | 3326285 | B1 | 5/2018 |
| EP | 3147681 | B1 | 11/2019 |
| JP | 2003075516 | A | 3/2003 |

OTHER PUBLICATIONS

German Search Report for European Application No. 23211984.2 dated Dec. 4, 2024, 8 pages.

2022 IEEE Applied Power Electronics Conference and Exposition (APEC), IEEE, 20, dated Mar. 20, 2022, Muduli Utkal Ranjan et al: ANN based On-board Fault Diagnostic for Induction Motor Drive in Low-Cost Electric Vehicles, pp. 153-158.

Search Report for German Patent Application No. 102022132023.5, dated Aug. 17, 2023, 6 pages.

* cited by examiner

*Primary Examiner* — Muhammad S Islam

(74) *Attorney, Agent, or Firm* — Christopher J. Volkmann; KELLY, HOLT & CHRISTENSON PLLC

(57) ABSTRACT

Device for detecting fault states in an electric machine comprising a rotor and a stator arranged so as to be electrically isolated from the rotor, comprising a connection electronics system for connecting the electric machine, wherein either the stator is connected by means of an electrical connection to a first electrical potential of the connection electronics system, said first electrical potential being stable with respect to the ground potential, or the stator is directly connected to a second electrical potential, which is stable with respect to the ground potential, and the second electrical potential is connected to the connection electronics system by means of the electrical connection, wherein a first sensor for measuring a first phase current and a second sensor for measuring a second phase current and a third sensor for measuring an electrical signal of the stator is formed via and/or at the electrical connection.

15 Claims, 1 Drawing Sheet

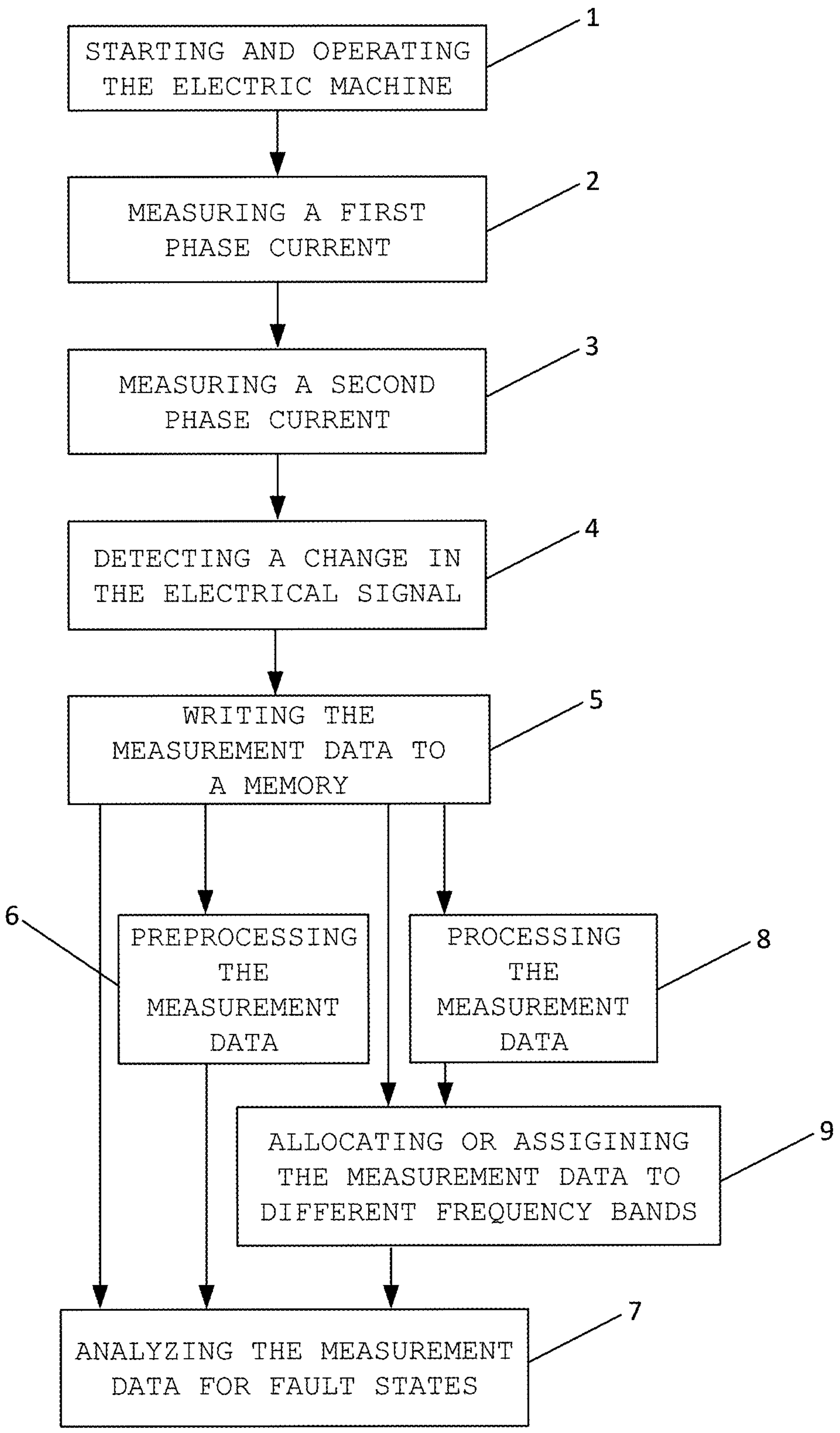
STARTING AND OPERATING THE ELECTRIC MACHINE
1
MEASURING A FIRST PHASE CURRENT
2
MEASURING A SECOND PHASE CURRENT
3
DETECTING A CHANGE IN THE ELECTRICAL SIGNAL
4
WRITING THE MEASUREMENT DATA TO A MEMORY
5
PREPROCESSING THE MEASUREMENT DATA
6
PROCESSING THE MEASUREMENT DATA
8
ALLOCATING OR ASSIGINING THE MEASUREMENT DATA TO DIFFERENT FREQUENCY BANDS
9
ANALYZING THE MEASUREMENT DATA FOR FAULT STATES
7

MACHINE LEARNING TECHNIQUES OF CLASSIFIERS FOR THE DETECTION OF FAULTS OR DEFECTS IN MOTORS

CROSS-REFERENCES TO RELATED APPLICATION

This application claims priority to German Application No. 102022132023.5, filed Dec. 2, 2022.

BRIEF DESCRIPTION OF THE DRAWINGS

FIG. 1 shows a schematic illustration of a method, in one example.

DETAILED DESCRIPTION

In order to create environmentally sustainable options for the production of electric motors of any kind, the description and prediction of life cycles of such machines may be a key factor. It is important here to use state-oriented maintenance systems that can provide information about the state of the electric machine by means of data analysis methods, such as the detection of faults, defects or anomalies, for example.

Machine learning techniques are usually used in this case and so-called classifiers are determined for the detection of anomalies, which may indicate, for example, faults or defects in motor bearings on the basis of specifications (for example characteristic curves) of the bearings. Machine and supervised learning in this case require large amounts of data that must be present at the time of the faulty state or the defective state or abnormal operation of the electric machine. However, it takes time to generate these amounts of data.

Data analysis methods for detecting motor bearing failures using data during normal operation are known from the prior art. In such methods, for example, a power spectrum is generated from current sensor signals, using which the normal state of a motor bearing can be determined. It is then possible to calculate probabilities of when there are deviations from the normal state. This can indicate, for example, insufficient lubrication, for example due to a lack of grease in the bearing of an electric machine.

It is also known from the prior art that insulation faults or insulation defects or bearing damage can be detected using machine currents in an electric machine. Generally, such electric machines are operated with a fixed connection to the ground potential. If fault currents occur due to a winding defect, these are common mode currents and have a higher frequency in contrast to the machine currents.

Furthermore, document EP 3 326 285 B1 discloses a device for reducing and/or preventing harmful bearing currents in an electric machine comprising a rotor and an isolated stator, wherein the stator is connected by an electrical connection to an electronics system potential at a potential tap of the connection electronics system, the electronics system potential being high-frequency, different from the ground potential and stable with respect thereto.

It is therefore also known from the prior art that an isolated stator can influence bearing voltages.

The disadvantage here is that, purely due to the amount of data required during the operation of the electric machine, possible defects can be detected only in a very complicated manner and not in a timely manner.

An object of the present disclosure is therefore to improve the options for calculating a remaining lifetime of an electric machine and to be able to better predict possible faults or defects during the operation of the machine.

The technical object is achieved by means of a subject having the technical features according to the independent claims. The dependent claims and the description provide advantageous embodiments.

According to one aspect, the technical problem of the present disclosure is solved by way of a device for detecting fault states in an electric machine comprising a rotor and a stator arranged so as to be electrically isolated from the rotor, comprising a connection electronics system for connecting the electric machine, wherein either the stator is connected by means of an electrical connection to a first electrical potential of the connection electronics system, said first electrical potential being stable with respect to the ground potential, or the stator is directly connected to a second electrical potential, which is stable with respect to the ground potential, and the second electrical potential is connected to the connection electronics system by means of the electrical connection, wherein a first sensor for measuring a first phase current and a second sensor for measuring a second phase current and a third sensor for measuring an electrical signal of the stator is formed via and/or at the electrical connection.

For the purposes of the present disclosure, a fault can also be understood as a defect. An electric machine may be designed, for example, as an electric motor or a three-phase electric motor or a brushless DC motor. The electrical connection may be formed, for example, as at least one capacitor, in particular as at least one Y-capacitor, and have a low impedance with a higher frequency. For the purposes of the present disclosure, higher frequency is to be understood as a frequency range of 1 kHz to 20 kHz. For the purposes of the present disclosure, the electrical signal is to be understood, for example, as a current and/or a potential.

In the case of the stator directly connected to the stable second potential, a mechanical connection may be provided, which is formed, for example, by means of screw connections or by means of joining of stator plates.

Insulation faults or other faults, such as uneven temperature profiles or bearing damage, for example, can advantageously be detected at an early stage. It is possible to achieve clear fault features or as an alternative a self-test of the measuring circuit.

One technically advantageous embodiment of the device provides for the electrical connection to be formed as a first capacitor and/or a first and a second capacitor, wherein the first and second capacitors are connected in series, wherein the first and/or the second capacitor is formed as a Y-capacitor, wherein, in particular, the first capacitor and the second capacitor are formed as a joint voltage divider.

The first and/or the second capacitor can advantageously be designed as a Y-capacitor for safe isolation from the potential of the stator. It is advantageously possible to infer the current by means of measuring the voltage and a first derivative of the voltage at the second capacitor directly by means of a second derivation. Furthermore, an advantage of such a circuit is the high-pass character, since, in particular, currents in the higher-frequency range can be measured with a better resolution, while currents in the low-frequency range, such as 50 Hz components, for example, can be suppressed.

According to a further aspect, the technical object of the present disclosure is achieved by way of a method for calculating the remaining lifetime of an electric machine comprising a rotor and a stator electrically isolated from the rotor, comprising a device according to any one of the preceding claims, and comprising the following method steps:

a) starting and operating the electric machine;

b) measuring a first phase current of an inverter to the electric machine by means of the first sensor;

c) measuring a second phase current of the inverter to the electric machine by means of the second sensor;

d) detecting a change in the electrical signal, in particular a current and/or a potential, of the stator by means of the third sensor;

e) writing the measurement data into a memory, in particular a non-volatile memory, wherein the measurement data preferably undergo mathematical preprocessing;

f) analyzing the measurement data for fault states in the electric machine, in particular by means of a mathematical function, preferably by means of a neural network.

For the purposes of the present disclosure, the term “inverter” is understood as an inverter circuit which, in order to generate a current form desired for operating the electric machine, for example by means of pulse width modulation (PWM), applies a voltage provided with a pulse pattern to terminals of the electric machine on average over time. For the purposes of the present disclosure, the term “current form” is understood as the change in the current over time.

For example, the inverter operates in this case at a switching frequency outside of the audible range, in particular at more than 16 kHz. Due to the switched pulse pattern, the output of the inverter produces a common mode voltage that jumps at the switching frequency of the inverter with respect to the ground potential.

The method of independent and additional current measurement advantageously makes possible a better classification or detection of any faults in the electric machine. Furthermore, it is advantageous that common mode currents and a higher resolution of these can be better detected since the reverse current via the Y-capacitor or the current via the contact to the stator is not superimposed by the torque-generating motor currents.

In the case of a grounded stator, if there is a fault in the insulation, a significant proportion of the current flows to ground, which can be identified using the sensors, for example by means of summing up the motor currents.

Due to the frequency characteristics of the capacitor of presenting a lower impedance at higher frequencies, it is thus advantageously possible to measure high-frequency components of the current. Although amplitudes of these high-frequency components of the current may depend in this case on the installation position and the grounding conditions, each grounding has an inductive component, which also contributes to a shift of the current components toward the Y-capacitor as the frequency increases and can advantageously be determined by means of the method.

For the purposes of the present disclosure, mathematical preprocessing means data compression or data processing.

The amount of data can advantageously be reduced by means of preprocessing the measurement data or certain characteristic values can be calculated in advance.

One technically advantageous embodiment of the method provides for the detection of the change in the electrical potential of the stator to be measured by means of a voltage measurement across the capacitor or by means of a current measurement of the capacitor current.

For example, a change in capacitance of the stator or a stator displacement current can be measured in order to detect the change in the potential of the stator. For the purposes of the present disclosure, a displacement current or a displaced current is understood as the component of an electrical current that is given by the change in the electrical flow over time.

If a fault occurs, for example damage to the insulation of the winding, this leads to a change in the stator displacement current and thus to a change in the capacitance between the stator and the fixed electronics system potential or ground potential. By connecting the stator via the Y-capacitor, the resulting fault can be determined metrologically either by means of measuring the voltage between the capacitor and the stator or by means of measuring the current through the capacitor.

In one technically advantageous embodiment, the method comprises the following method step e1) processing the measurement data, in particular allocating or assigning the measurement data to different frequency bands.

For example, the measurement data can be processed or allocated or assigned by means of a fast Fourier transformation or a wavelet transformation. For example, the measurement data can be processed by means of a mathematical function, or by means of integration, or by means of subtraction or by means of filtering the data. Furthermore, for example, the measurement data can be processed by means of artificial intelligence or by means of machine learning techniques, in particular by means of neural networks, genetic algorithms, support vector machines, k-means, kernel regression or discriminant analysis, where, for example, a so-called first training data set can be generated based on computational models and algorithms for classification, bundling, regression.

It is advantageously possible to calculate properties which can be assigned to a possible fault in the insulation of the stator, or possible bearing damage, or an erroneous temperature of the electric machine.

Another technically advantageous embodiment provides for a self-test to be carried out, wherein, in particular, the first phase current and the second phase current and the reverse current are measured simultaneously, with these three currents being put into a ratio with one another.

This advantageously makes it possible to better and more clearly identify properties of a possible fault in the electric machine.

Another technically advantageous embodiment provides for the operation of the electric machine to be regulated by means of the three sensors.

Additional identification of properties of possible faults of the electric machine can advantageously be made possible, for example, by means of a combination of the parameters and signals present in the control system and/or on the printed circuit board (PCB), such as, for example, position angle, duty cycle or link voltage, and therefore abnormal states of the electric machine can be identified reliably.

Another technically advantageous embodiment of the method provides for it to be designed for the operation of the device according to any one of the preceding claim 1 or 2.

An exemplary embodiment of the invention is illustrated in the FIGURE and is described in more detail below.

FIG. 1 schematically illustrates a method for calculating the remaining lifetime of an electric machine comprising a rotor and a stator electrically isolated from the rotor, comprising a device according to any one of the preceding claims, and comprising the following method steps:

a) starting and operating the electric machine 1;

b) measuring a first phase current of an inverter to the electric machine by means of the first sensor 2;

c) measuring a second phase current of the inverter to the electric machine by means of the second sensor 3;

d) detecting a change in the electrical signal 4, in particular a current and/or a potential, of the stator by means of the third sensor;

e) writing the measurement data into a memory 5, in particular a non-volatile memory, wherein the measurement data 6 preferably undergo mathematical preprocessing;

f) analyzing the measurement data for fault states in the electric machine 7, in particular by means of a mathematical function, preferably by means of a neural network.

FIG. 1 further illustrates a method step e1) processing the measurement data 8, in particular allocating or assigning the measurement data to different frequency bands 9.

Details of the individual method steps are described in the aforementioned general part of the description of the invention. These are also referred to directly and fully for the exemplary embodiment and made the subject of the exemplary embodiment.

The method according to one example of the invention can be triggered individually, or as a loop, in particular as a periodic loop or via a trigger event, for example a control event.

Although the present invention has been described with reference to preferred embodiments, workers skilled in the art will recognize that changes may be made in form and detail without departing from the spirit and scope of the invention.

REFERENCE SIGNS

1 Starting and operating the electric machine
2 Measuring a first phase current
3 Measuring a second phase current
4 Detecting a change in the electrical signal
Writing the measurement data to a memory
6 Preprocessing the measurement data
7 Analyzing the measurement data for fault states
8 Processing the measurement data
9 Allocating or assigning the measurement data to different frequency bands

The invention claimed is:

1. A device for detecting fault states in an electric machine comprising:

a rotor and a stator arranged so as to be electrically isolated from the rotor, a connection electronics system for connecting the electric machine, the connection electronics system comprising a first capacitor and a second capacitor, wherein either the stator is connected by an electrical connection to a first electrical potential of the connection electronics system, the first electrical potential being stable with respect to a ground potential, or the stator is directly connected to a second electrical potential, the second electrical potential being stable with respect to the ground potential, and the second electrical potential is connected to the connection electronics system by the electrical connection, wherein the electrical connection is formed as at least one of the first capacitor or the first capacitor and the second capacitor, wherein the first capacitor and the second capacitor are connected in series, wherein at least one of the first capacitor or the second capacitor is formed as a Y-capacitor, wherein the first capacitor and the second capacitor are formed as a joint voltage divider, and wherein a first sensor for measuring a first phase current, a second sensor for measuring a second phase current, and a third sensor for measuring an electrical signal of the stator are formed via and/or at the electrical connection.

2. The device according to claim 1, wherein the third sensor is configured to detect a change in the electrical signal of the stator.

3. The device according to claim 1, wherein the connection electronics system is configured to perform a self-test, and wherein the self-test includes simultaneously measuring the first phase current, the second phase current, and a reverse current and putting the first phase current, the second phase current, and the reverse current into a ratio with one another.

4. The device according to claim 1, wherein operation of the electric machine is regulated by the first sensor, the second sensor, and the third sensor.

5. The device according to claim 2, wherein the change in the electrical signal of the stator is measured by a voltage measurement across a capacitor.

6. The device according to claim 2, wherein the change in the electrical signal of the stator is measured by a current measurement of a current of the capacitor.

7. The device according to claim 2, wherein the connection electronics system is configured to generate measurement data based on the first phase current, the second phase current, and the change in the electrical signal of the stator.

8. The device according to claim 7, wherein the connection electronics system is configured to process the measurement data by allocating or assigning the measurement data to different frequency bands.

9. The device according to claim 7, wherein the connection electronics system is configured to analyze the measurement data with a neural network to determine fault states in the electric machine.

10. A method for calculating a remaining lifetime of an electric machine comprising a rotor and a stator electrically isolated from the rotor, the method comprising:

starting and operating the electric machine;

measuring a first phase current of an inverter to the electric machine with a first sensor;

measuring a second phase current of the inverter to the electric machine with a second sensor;

detecting a change in an electrical signal of the stator with a third sensor;

generating measurement data based on the first phase current, the second phase current, and the change in the electrical signal;

writing the measurement data into a memory; and analyzing the measurement data for fault states in the electric machine by a mathematical function.

11. The method according to claim 10, wherein detecting the change in the electrical signal of the stator includes detecting a voltage measurement across a capacitor or a current measurement of a current of the capacitor.

12. The method according to claim 10, comprising:

processing the measurement data, including allocating or assigning the measurement data to different frequency bands.

13. The method according to claim 10, and further comprising:

performing a self-test, wherein performing the self-test includes simultaneously measuring the first phase current, the second phase current, and a reverse current, and wherein performing the self-test further includes putting the first phase current, the second phase current, and the reverse current into a ratio with one another.

14. The method according to claim 10, wherein the operation of the electric machine is regulated by the first sensor, the second sensor, and the third sensor.

15. The method according to claim 10, wherein analyzing the measurement data for fault states comprises:

analyzing the measurement data for fault states in the electric machine with a neural network.

* * * * *